(12) United States Patent
Son

(10) Patent No.: US 8,994,301 B2
(45) Date of Patent: Mar. 31, 2015

(54) ELECTRIC BICYCLE DRIVING APPARATUS

(71) Applicant: Mando Corporation, Gyeonggi-do (KR)

(72) Inventor: Hong Youp Son, Gyunggi-do (KR)

(73) Assignee: Mando Corporation, Pyeongtaek-si, Gyeonggi-do (KR)

( * ) Notice: Subject to any disclaimer, the term of this patent is extended or adjusted under 35 U.S.C. 154(b) by 95 days.

(21) Appl. No.: 13/683,170

(22) Filed: Nov. 21, 2012

(65) Prior Publication Data

US 2014/0077730 A1 Mar. 20, 2014

(30) Foreign Application Priority Data

Sep. 19, 2012 (KR) .......................... 10-2012-104167

(51) Int. Cl.
*H02P 1/00* (2006.01)
*H02P 1/04* (2006.01)
*H02P 7/292* (2006.01)
*B60L 11/00* (2006.01)
*B60L 15/20* (2006.01)

(52) U.S. Cl.
CPC .............. *H02P 7/292* (2013.01); *B60L 11/007* (2013.01); *B60L 15/2045* (2013.01); *B60L 2200/12* (2013.01)
USPC ....................... 318/139; 318/400.09; 320/118

(58) Field of Classification Search
CPC ................................. H02P 7/292; H02P 7/06
USPC ............... 318/139, 400.32; 701/22; 363/126; 361/502
See application file for complete search history.

(56) References Cited

U.S. PATENT DOCUMENTS 3,915,250 A * 10/1975 Laden et al. .................. 180/220
4,523,139 A * 6/1985 Schwarz et al. ............. 320/130
6,175,765 B1 * 1/2001 Sullivan et al. .................... 607/5
6,314,238 B1 * 11/2001 Imamura et al. .................. 396/6

(Continued)

FOREIGN PATENT DOCUMENTS

JP 2011-083490 A 4/2011

OTHER PUBLICATIONS

Bork et al, Speed Match/Lost Grating Detection Apparatus , Feb. 1, 1981, IBM, TDB 02-81 p. 4011-4016.*
Bork et al , Speed Match/Lost Grating Detection Apparatus, Feb. 10, 2005, IBM.*

(Continued)

*Primary Examiner* — Bentsu Ro
*Assistant Examiner* — Zemenay Truneh
(74) *Attorney, Agent, or Firm* — McDermott Will & Emery LLP

(57) ABSTRACT

An electric-bicycle driving apparatus includes a speed-change mode operator to output a low-speed or high-speed mode signal, a controller to output a first or second control signal corresponding to the low-speed or high-speed mode signal, a first motor driver to output a first motor-driving signal to drive a motor in a low-speed mode in response to the low-speed mode signal, a second motor driver to output a second motor-driving signal to drive the motor in a high-speed mode in response to the high-speed mode signal, a motor-drive-load booster to boost load of the second motor-driving signal using battery power under control of the controller in response to the high-speed mode signal, and a motor speed-change switching unit to selectively receive a switching enable signal from the controller so as to be turned on to provide the second motor-driving signal having the boosted load to the motor.

16 Claims, 7 Drawing Sheets

(56) References Cited

U.S. PATENT DOCUMENTS 6,396,137 B1 * 5/2002 Klughart .................. 257/691
7,016,203 B2 * 3/2006 Xu et al. .................. 363/21.04

OTHER PUBLICATIONS

Korean Office Action, w/ English translation thereof, issued in Korean Patent Application No. KR 10-2012-0023619 dated May 9, 2013.

* cited by examiner

ELECTRIC BICYCLE DRIVING APPARATUS

CROSS-REFERENCE TO RELATED APPLICATION

This application claims the benefit of Korean Patent Application No. 2012-0104167, filed on Sep. 19, 2012 in the Korean Intellectual Property Office, the disclosure of which is incorporated herein by reference.

BACKGROUND

1. Field

Embodiments of the present invention relate to an electric bicycle driving apparatus.

2. Description of the Related Art

In general, electric bicycle driving apparatuses are provided to drive electric bicycles.

Most conventional driving apparatuses for electric bicycles have a limit to effective operation of a motor driver that drives a motor in a low-speed or high-speed motor driving mode, and consequently have a limit to reduction in battery power consumption.

Recently, studies into improved electric bicycle driving apparatuses to reduce a speed change mode time in consideration of battery power consumption when a motor of an electric bicycle is driven in a low-speed mode or high-speed mode have been performed.

SUMMARY

Therefore, it is an aspect of the present invention to provide an electric bicycle driving apparatus which may rapidly reduce a speed change mode time in consideration of battery power consumption.

Additional aspects of the invention will be set forth in part in the description which follows and, in part, will be obvious from the description, or may be learned by practice of the invention.

In accordance with one aspect of the present invention, an bicycle driving apparatus includes a speed change mode operator to output a low-speed mode signal or a high-speed mode signal, a controller to receive the low-speed mode signal or high-speed mode signal output from the speed change mode operator and output a first control signal corresponding to the low-speed mode signal or a second control signal corresponding to the high-speed mode signal, a first motor driver to receive the first control signal and output a first motor driving signal to drive a motor in a low-speed mode when the speed change mode operator outputs the low-speed mode signal, a second motor driver to receive the second control signal and output a second motor driving signal to drive the motor, which has been rotated by driving power of the first motor driving signal, in a high-speed mode when the speed change mode operator outputs the high-speed mode signal, a motor drive load booster to receive battery power from a battery under control of the controller and boost load of the second motor driving signal output from the second motor driver to output the signal having the boosted load when the speed change mode operator outputs the high-speed mode signal, and a motor speed change switching unit to selectively receive a switching enable signal from the controller so as to be turned on to provide the second motor driving signal having the boosted load to the motor.

The motor drive load booster may include more than one first capacitor electrically connected to the battery, more than one first resistor electrically connected to the more than one first capacitor, and more than one second resistor electrically connected to the more than one first resistor and second motor driver.

The motor drive load booster may further include more than one zener diode electrically connected to the battery and more than one first capacitor.

The motor drive load booster may include more than one third resistor electrically connected to the second motor driver, more than one fourth resistor electrically connected to the more than one third resistor and motor speed change switching unit, and more than one fourth rectifying diode electrically connected to the second motor driver and more than one third resistor.

The motor drive load booster may further include more than one zener diode electrically connected to the more than one fourth rectifying diode, more than one third resistor and more than one fourth resistor.

The motor speed change switching unit may include more than one first rectifying diode electrically connected to one side of the speed change mode operator, a first switching device electrically connected to the more than one first rectifying diode and motor drive load booster, more than one fifth resistor electrically connected to the more than one first rectifying diode, first switching device, and motor drive load booster, more than one second rectifying diode electrically connected to the other side of the speed change mode operator, a second switching device electrically connected to the more than one second rectifying diode and first switching device, and more than one sixth resistor electrically connected to the more than one second rectifying diode, second switching device and motor.

Each of the first switching device and second switching device may include at least one of a Metal-Oxide Semiconductor Field Effect Transistor (MOSFET) and a Bipolar Junction Transistor (BJT).

The first switching device may further include more than one zener diode electrically connected to the more than one fifth resistor and second switching device.

The second switching device may further include more than one zener diode electrically connected to the first switching device and more than one sixth resistor.

The motor speed change switching unit may further include more than one zener diode electrically connected to the motor drive load booster and more than one fifth resistor.

The motor speed change switching unit may further include more than one zener diode electrically connected to the more than one sixth resistor and motor.

The motor speed change switching unit may include more than one third rectifying diode electrically connected to one side of the speed change mode operator, a third switching device electrically connected to the more than one third rectifying diode and motor drive load booster, more than one seventh resistor electrically connected to the more than one third rectifying diode and third switching device, and a fourth switching device electrically connected to the more than one third rectifying diode, more than one seventh resistor and motor.

Each of the third switching device and fourth switching device may include at least one of an MOSFET and a BJT.

The third switching device may further include more than one zener diode electrically connected to the motor drive load booster and more than one seventh resistor.

The fourth switching device may further include more than one zener diode electrically connected to the more than one seventh resistor and motor.

The motor speed change switching unit may further include more than one zener diode electrically connected to the more than one seventh resistor, more than one third rectifying diode, and fourth switching device.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
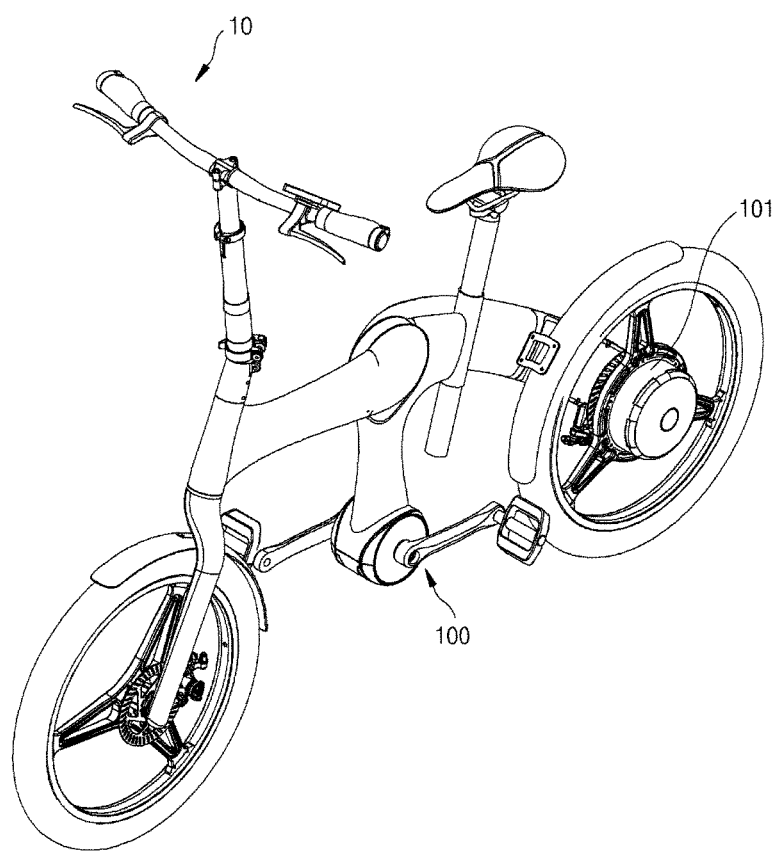
FIG. 1 is a perspective view illustrating an electric bicycle including an electric bicycle driving apparatus according to a first embodiment of the present invention.

Reference will now be made in detail to the embodiments of the present invention, examples of which are illustrated in the accompanying drawings, wherein like reference numerals refer to like elements throughout.

<First Embodiment>

Figure 2:
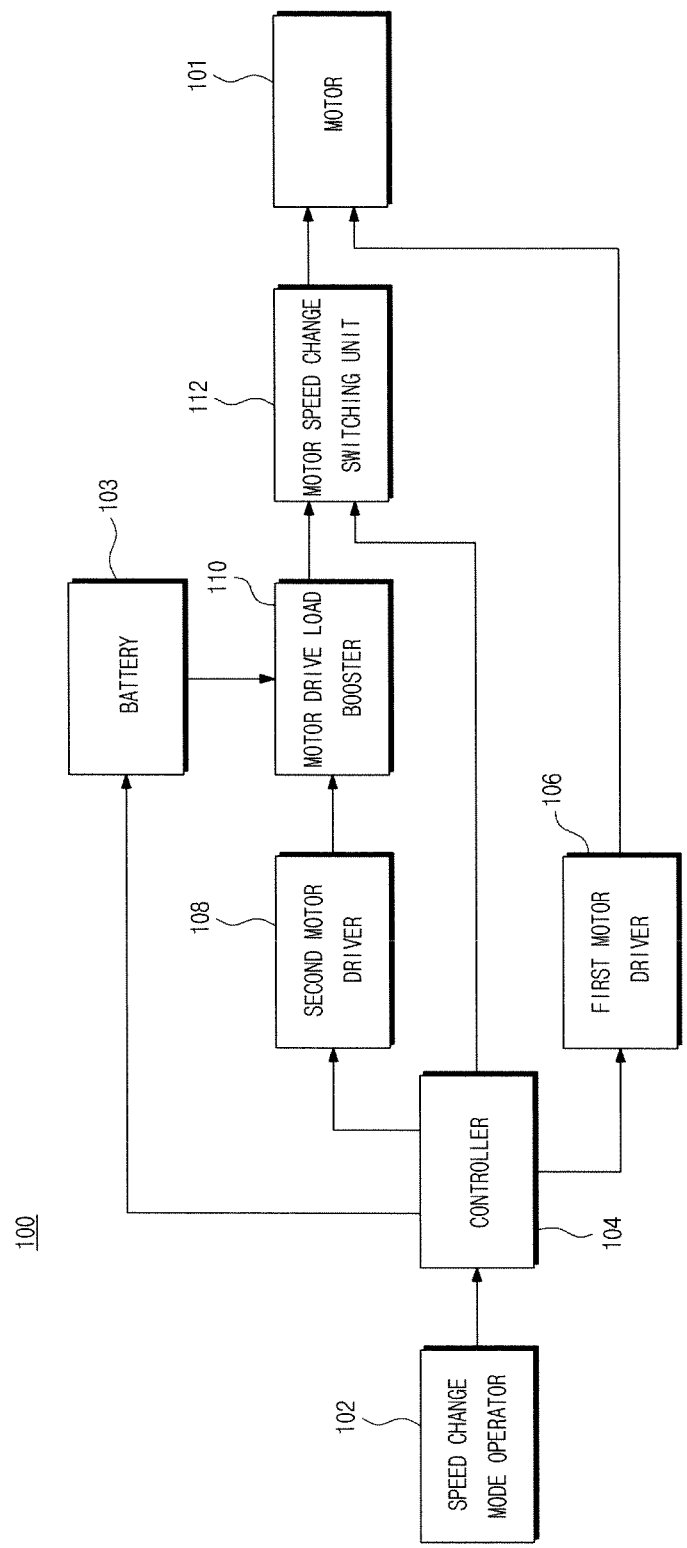
FIG. 2 is a block diagram illustrating the configuration of the electric bicycle driving apparatus according to the first embodiment of the present invention.

FIG. 1 is a perspective view illustrating an electric bicycle including an electric bicycle driving apparatus according to a first embodiment of the present invention, and FIG. 2 is a block diagram illustrating the configuration of the electric bicycle driving apparatus according to the first embodiment of the present invention.

Figure 3:
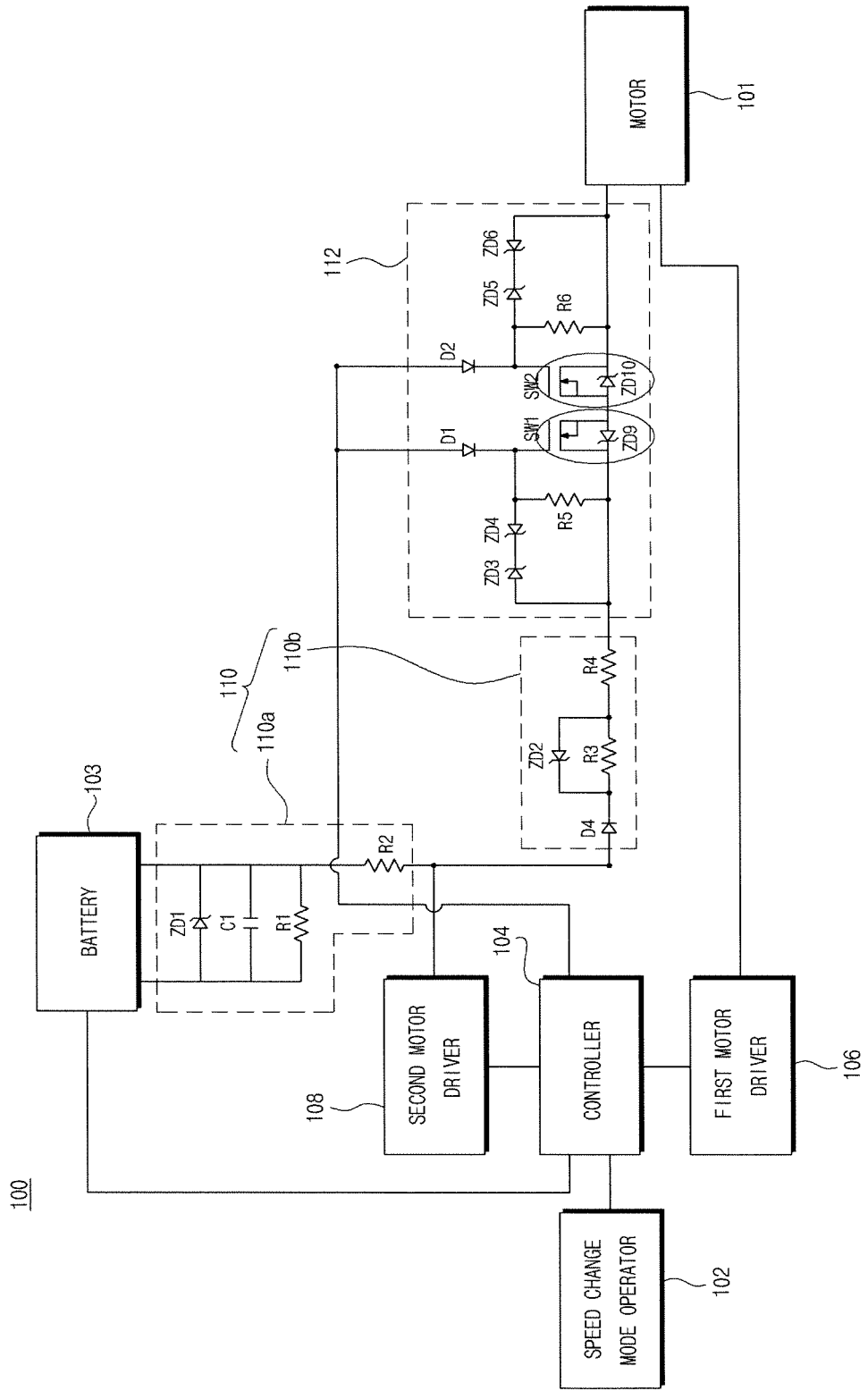
FIG. 3 is an equivalent circuit diagram illustrating an example of the electric bicycle driving apparatus according to the first embodiment of the present invention.
Figure 4:
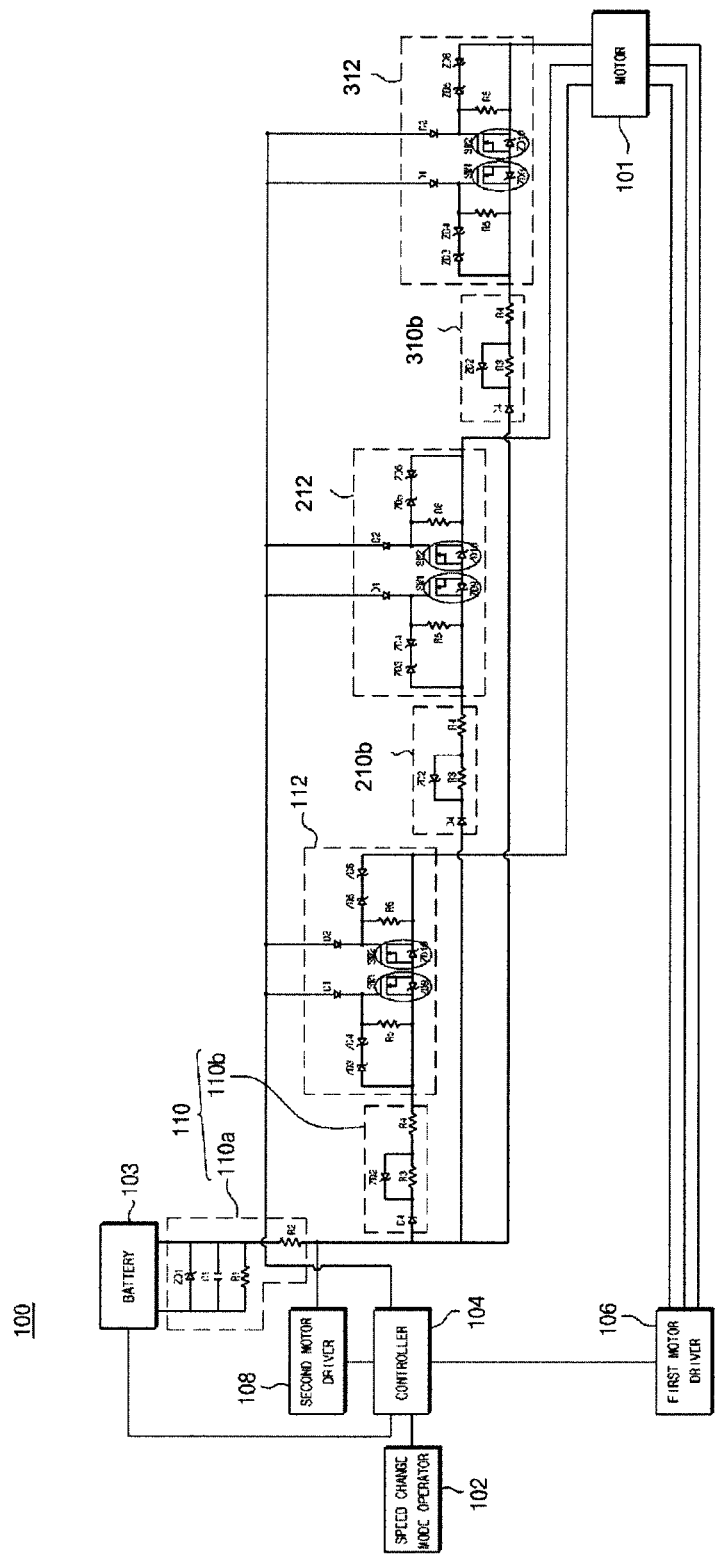
FIG. 4 is an equivalent circuit diagram illustrating another example of the electric bicycle driving apparatus according to the first embodiment of the present invention.

FIG. 3 is an equivalent circuit diagram illustrating an example of the electric bicycle driving apparatus according to the first embodiment of the present invention, and FIG. 4 is an equivalent circuit diagram illustrating another example of the electric bicycle driving apparatus according to the first embodiment of the present invention.

First, referring to FIG. 1, the electric bicycle driving apparatus according to the first embodiment of the present invention, denoted by reference numeral 100, is provided at one side and the other side of the electric bicycle, denoted by reference numeral 10.

Next, referring to FIGS. 2 to 4, the electric bicycle driving apparatus 100 according to the first embodiment of the present invention includes a speed change mode operator 102, controller 104, first motor driver 106, second motor driver 108, motor drive load booster 110, and a motor speed change switching unit 112. Motor speed change switching units 212 and 312 each may have the same configuration as that of the motor speed change switching unit 112.

The speed change mode operator 102 is provided to output a low-speed mode signal or a high-speed mode signal.

The speed change mode operator 102 may be provided at a portion of a handle bar of the electric bicycle 10.

The controller 104 receives the low-speed mode signal or high-speed mode signal output from the speed change mode operator 102, and outputs a first control signal corresponding to the low-speed mode signal or a second control signal corresponding to the high-speed mode signal.

The controller 104 may include an Electronic Controller Unit (ECU) or a Micro Controller Unit (MCU).

The first motor driver 106 receives the first control signal and outputs a first motor driving signal to drive a motor 101 in a low-speed mode when the speed change mode operator 102 outputs the low-speed mode signal.

The second motor driver 108 receives the second control signal and outputs a second motor driving signal to drive the motor 101, which has been rotated by driving power of the first motor driving signal, in a high-speed mode when the speed change mode operator 102 outputs the high-speed mode signal.

At least one of the first motor driving signal and the second motor driving signal may be a three-phase motor driving signal.

The motor drive load booster 110 receives power from a battery 103 under control of the controller 104, and boosts load of the second motor driving signal output from the second motor driver 108 to thereby output the signal having the boosted load when the speed change mode operator 102 outputs the high-speed mode signal.

In one example, as illustrated in FIGS. 3 and 4, the motor drive load booster 110 may include a first motor drive load booster 110a and a second motor drive load booster 110b.

The first motor drive load booster 110a may include more than one first capacitor C1, more than one first resistor R1, and more than one second resistor R2.

The more than one first capacitor C1 may be electrically connected to the battery 103, and in turn the more than one first resistor R1 may be electrically connected to the more than one first capacitor C1.

The more than one second resistor R2 may be electrically connected to the more than one first resistor R1 and second motor driver 108.

The more than one first resistor R1 and more than one second resistor R2 may be partial-pressure resistors.

The first motor drive load booster 110a may further include more than one zener diode ZD1, which is electrically connected to the battery 103 and more than one first capacitor C1 to cut off an abnormal signal from the battery 103.

The second motor drive load booster 110b may include more than one third resistor R3, more than one fourth resistor R4, and more than one fourth rectifying diode D4.

The more than one third resistor R3 may be electrically connected to the second motor driver 108, and the more than one fourth resistor R4 may be electrically connected to the more than one third resistor R3 and motor speed change switching unit 112 that will be described hereinafter.

The more than one fourth rectifying diode D4 may be electrically connected to the second motor driver 108 and more than one third resistor R3.

The second motor drive load booster 110b may further include more than one zener diode ZD2, which is electrically connected to the more than one fourth rectifying diode D4, more than one third resistor R3 and more than one fourth resistor R4 to cut off an abnormal signal from the motor speed change switching unit 112 that will be described hereinafter.

The motor drive load booster 110; 110a and 110b may create a first current-path between the more than one first capacitor C1, more than one first resistor R1 and more than one second resistor R2, and a second current-path between the more than one third resistor R3, more than one fourth resistor R4 and more than one fourth rectifying diode D4. Thereby, when the speed change mode operator 102 outputs a high-speed mode signal, the motor drive load booster 110; 110a and 110b receives power from the battery 103 and boosts load so as to enable rapid output of the second motor driving signal from the second motor driver 108 under control of the controller 104. Motor drive load booster 210b and 310b may have the same configuration as that of the motor drive load booster 110b.

The motor speed change switching unit 112 is turned on upon selectively receiving a switching enable signal from the controller 104, and provides the second motor driving signal having the boosted load to the motor 101.

The motor speed change switching unit 112 may include more than one first rectifying diode D1, first switching device SW1, more than one fifth resistor R5, more than one second rectifying diode D2, second switching device SW2, and more than one sixth resistor R6.

The more than one first rectifying diode D1 may be electrically connected to one side of the speed change mode operator 102, and the first switching device SW1 may be electrically connected to the more than one first rectifying diode D1 and motor drive load booster 110.

The first switching device SW1 may include at least one of a Metal-Oxide Semiconductor Field Effect Transistor (MOSFET) and a Bipolar Junction Transistor (BJT).

The first switching device SW1 may further include more than one zener diode ZD9, which is electrically connected to the more than one fifth resistor R5 and second switching device SW2 to cut off an abnormal signal from the motor 101.

The motor speed change switching unit 112 may further include more than one zener diode ZD3 and ZD4, which is electrically connected to the motor drive load booster 110 and more than one fifth resistor R5 to cut off an abnormal signal from at least one of the controller 104, motor drive load booster 110 and motor 101.

The more than one fifth resistor R5 may be electrically connected to the more than one first rectifying diode D1, first switching device SW1 and motor drive load booster 110, and the more than one second rectifying diode D2 may be electrically connected to the other side of the speed change mode operator 102.

The second switching device SW2 may be electrically connected to the more than one second rectifying diode D2 and first switching device SW1, and the more than one sixth resistor R6 may be electrically connected to the more than one second rectifying diode D2, second switching device SW2 and motor 101.

The second switching device SW2 may include at least one of an MOSFET and a BJT.

The second switching device SW2 may further include more than one zener diode ZD10, which is electrically connected to the first switching device SW1 and more than one sixth resistor R6 to cut off an abnormal signal from the motor drive load booster 110.

The motor speed change switching unit 112 may further include more than one zener diode ZD5 and ZD6, which is electrically connected to the more than one sixth resistor R6 and motor 101 to cut off an abnormal signal from at least one of the motor drive load booster 110 and motor 101.

Hereinafter, a method to drive the electric bicycle 10 using the electric bicycle driving apparatus 100 according to the first embodiment of the present invention will be described.

First, the method to drive the electric bicycle 10 using the electric bicycle driving apparatus 100 according to the first embodiment of the present invention includes receiving a first control signal from the controller 104 and outputting a first motor driving signal from the first motor driver 106 to drive the motor 101 in a low-speed mode when the speed change mode operator 102 outputs a low-speed mode signal.

Thereafter, the method to drive the electric bicycle 10 using the electric bicycle driving apparatus 100 according to the first embodiment of the present invention includes receiving a second control signal from the controller 104 and outputting a second motor driving signal from the second motor driver 108 to drive the motor 101, which has been rotated by driving power of the first motor driving signal, in a high-speed mode when the speed change mode operator 102 outputs a high-speed mode signal.

Thereafter, the method to drive the electric bicycle 10 using the electric bicycle driving apparatus 100 according to the first embodiment of the present invention includes receiving power from the battery 103 under control of the controller 104 and boosting load of the second motor driving signal output from the second motor driver 108 to thereby output the signal having the boosted signal when the speed change mode operator 102 outputs the high-speed mode signal.

Finally, the method to drive the electric bicycle 10 using the electric bicycle driving apparatus 100 according to the first embodiment of the present invention includes turning on the motor speed change switching unit 112 upon selectively receiving a switching enable signal from the controller 104 to provide the second motor driving signal having the boosted load to the motor 101.

As described above, the electric bicycle driving apparatus 100 according to the first embodiment of the present invention includes the speed change mode operator 102, controller 104, first motor driver 106, second motor driver 108, motor drive load booster 110, and a motor speed change switching unit 112.

Accordingly, the electric bicycle driving apparatus 100 according to the first embodiment of the present invention may provide the second motor driving signal having the boosted load from the motor drive load booster 110 to the motor 101 as the motor speed change switching unit 112 is turned on when the first motor driving signal or second motor driving signal output from the first motor driver 106 or second motor driver 108 is applied to the motor 101 for a speed change mode.

In this way, the electric bicycle driving apparatus 100 according to the first embodiment of the present invention may achieve rapid switching response of the load boosted via the motor drive load booster 110 and turning-on of the motor speed change switching unit 112 when the motor 101 is driven in a speed change mode, which may reduce a speed change mode time in consideration of battery power consumption.

<Second Embodiment>

Figure 5:
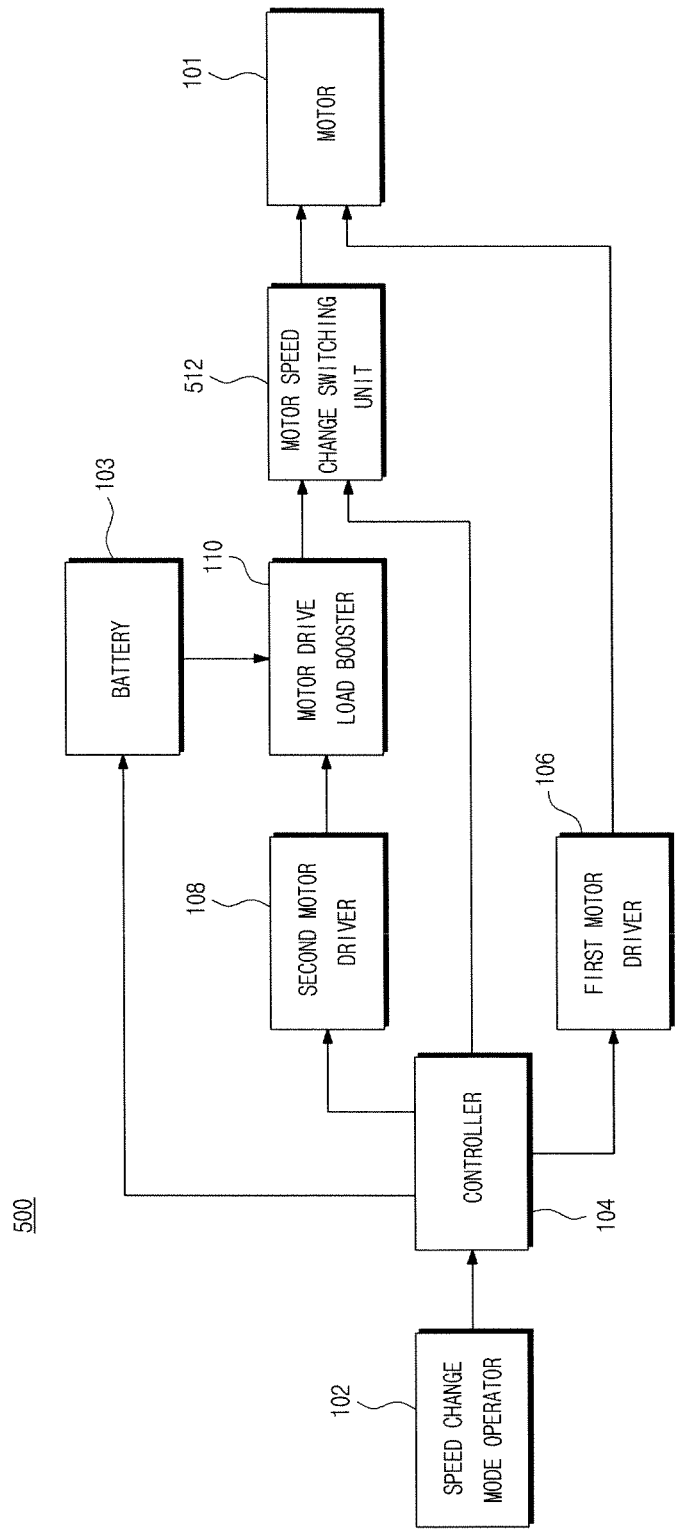
FIG. 5 is a block diagram illustrating a configuration of the electric bicycle driving apparatus according to the second embodiment of the present invention.
Figure 6:
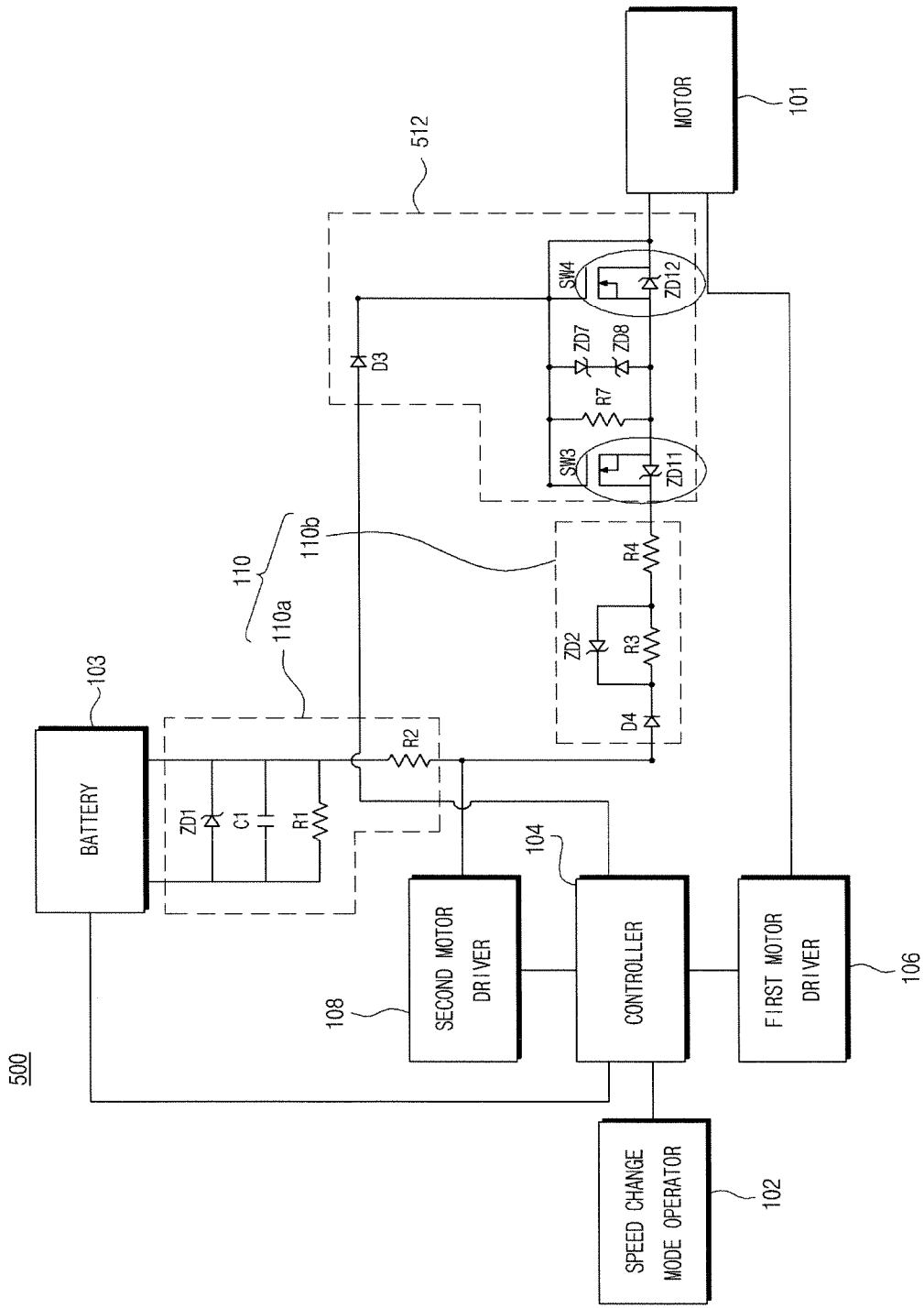
FIG. 6 is an equivalent circuit diagram illustrating an example of the electric bicycle driving apparatus according to the second embodiment of the present invention.

FIG. 5 is a block diagram illustrating a configuration of the electric bicycle driving apparatus according to the second embodiment of the present invention, and FIG. 6 is an equivalent circuit diagram illustrating an example of the electric bicycle driving apparatus according to the second embodiment of the present invention.

Figure 7:
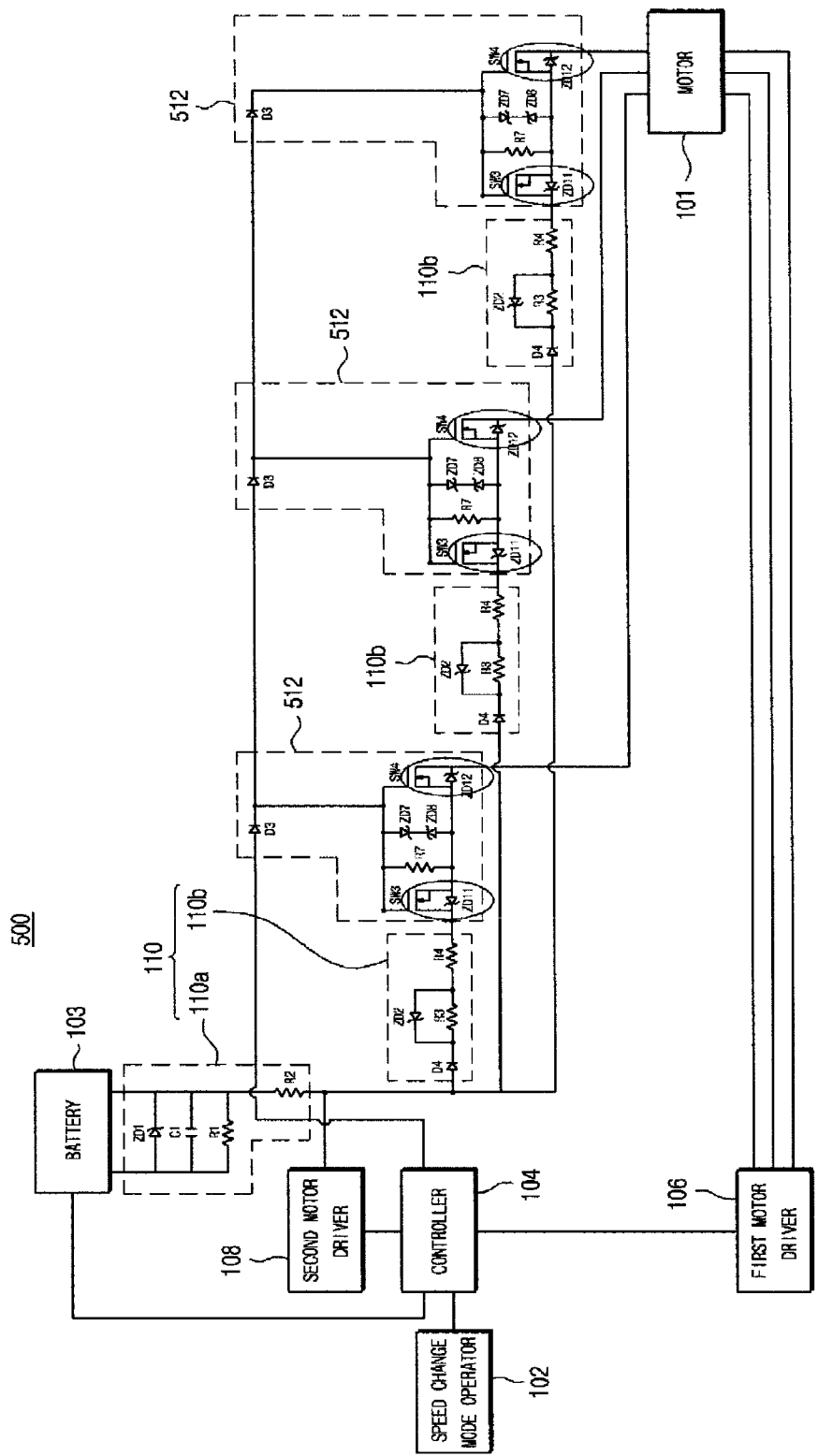
FIG. 7 is an equivalent circuit diagram illustrating another example of the electric bicycle driving apparatus according to the second embodiment of the present invention.

FIG. 7 is an equivalent circuit diagram illustrating another example of the electric bicycle driving apparatus according to the second embodiment of the present invention.

Referring to FIGS. 5 to 7, the electric bicycle driving apparatus 500 according to the second embodiment of the present invention includes the speed change mode operator 102, controller 104, first motor driver 106, second motor driver 108, motor drive load booster 110, and a motor speed change switching unit 512.

The speed change mode operator 102 is provided to output a low-speed mode signal or a high-speed mode signal.

The speed change mode operator 102 may be provided at a portion of a handle bar of the electric bicycle 10.

The controller 104 receives the low-speed mode signal or high-speed mode signal output from the speed change mode operator 101, and outputs a first control signal corresponding to the low-speed mode signal or a second control signal corresponding to the high-speed mode signal.

The controller 104 may include an ECU or an MCU.

The first motor driver 106 receives the first control signal, and outputs a first motor driving signal to drive the motor 101 in a low-speed mode when the speed change mode operator 102 outputs the low-speed mode signal.

The second motor driver 108 receives the second control signal and outputs a second motor driving signal to drive the motor 101, which has been rotated by driving power of the first motor driving signal, in a high-speed mode when the speed change mode operator 102 outputs the high-speed mode signal.

At least one of the first motor driving signal and the second motor driving signal may be a three-phase motor driving signal.

The motor drive load booster 110 receives power from the battery 103 under control of the controller 104, and boosts load of the second motor driving signal output from the second motor driver 108 to thereby output the resulting signal when the speed change mode operator 102 outputs the high-speed mode signal.

In one example, as illustrated in FIGS. 6 and 7, the motor drive load booster 110 may include the first motor drive load booster 110a and second motor drive load booster 110b.

The first motor drive load booster 110a may include the more than one first capacitor C1, more than one first resistor R1, and more than one second resistor R2.

The more than one first capacitor C1 may be electrically connected to the battery 103, and in turn the more than one first resistor R1 may be electrically connected to the more than one first capacitor C1.

The more than one second resistor R2 may be electrically connected to the more than one first resistor R1 and second motor driver 108.

The more than one first resistor R1 and more than one second resistor R2 may be partial-pressure resistors.

The first motor drive load booster 110a may further include the more than one zener diode ZD1, which is electrically connected to the battery 103 and more than one first capacitor C1 to cut off an abnormal signal from the battery 103.

The second motor drive load booster 110b may include the more than one third resistor R3, more than one fourth resistor R4, and more than one fourth rectifying diode D4.

The more than one third resistor R3 may be electrically connected to the second motor driver 108, and the more than one fourth resistor R4 may be electrically connected to the more than one third resistor R3 and motor speed change switching unit 112 that will be described hereinafter.

The more than one fourth rectifying diode D4 may be electrically connected to the second motor driver 108 and more than one third resistor R3.

The second motor drive load booster 110b may further include more than one zener diode ZD2, which is electrically connected to the more than one fourth rectifying diode D4, more than one third resistor R3 and more than one fourth resistor R4 to cut off an abnormal signal from the motor speed change switching unit 112 that will be described hereinafter.

The motor drive load booster 100; 100a and 100b may create the first current-path between the more than one first capacitor C1, more than one first resistor R1 and more than one second resistor R2, and the second current-path between the more than one third resistor R3, more than one fourth resistor R4 and more than one fourth rectifying diode D4. Thereby, when the speed change mode operator 102 outputs a high-speed mode signal, the motor drive load booster 100; 100a and 100b receives power from the battery 103 and boosts load so as to enable rapid output of the second motor driving signal from the second motor driver 108 under control of the controller 104.

The motor speed change switching unit 512 may include more than one third rectifying diode D3, third switching device SW3, more than one seventh resistor R7, and fourth switching device SW4.

The more than one third rectifying diode D3 may be electrically connected to one side of the speed change mode operator 102, and the third switching device SW3 may be electrically connected to the more than one third rectifying diode D1 and motor drive load booster 110.

The third switching device SW3 may include at least one of an MOSFET and a BJT.

The third switching device SW3 may further include more than one zener diode ZD11, which is electrically connected to the motor drive load booster 110 and more than one seventh resistor R7 to cut off an abnormal signal from the motor 101.

The more than one seventh resistor R7 may be electrically connected to the more than one third rectifying diode D3 and third switching device SW3, and the fourth switching device SW4 may be electrically connected to the more than one third rectifying diode D3, more than one seventh resistor R7 and motor 101.

The fourth switching device SW4 may include at least one of an MOSFET and a BJT.

The fourth switching device SW4 may further include more than one zener diode ZD12, which is electrically connected to the more than one seventh resistor R7 and motor 101 to cut off an abnormal signal from the motor drive load booster 110.

The motor speed change switching unit 512 may further include more than one zener diode ZD7 and ZD8, which is electrically connected to the more than one seventh resistor R7, more than one third rectifying diode D3 and fourth switching device SW4 to cut off an abnormal signal from at least one of the controller 104, motor drive load booster 110 and motor 101.

Hereinafter, a method to drive the electric bicycle (10, see FIG. 1) using the electric bicycle driving apparatus 500 according to the second embodiment of the present invention will be described.

First, the method to drive the electric bicycle (10, see FIG. 1) using the electric bicycle driving apparatus 500 according to the second embodiment of the present invention includes receiving a first control signal from the controller 104 and outputting a first motor driving signal from the first motor driver 106 to drive the motor 101 in a low-speed mode when the speed change mode operator 102 outputs a low-speed mode signal.

Thereafter, the method to drive the electric bicycle (10, see FIG.1) using the electric bicycle driving apparatus 500 according to the second embodiment of the present invention includes receiving a second control signal from the controller 104 and outputting a second motor driving signal from the second motor driver 108 to drive the motor 101, which has been rotated by driving power of the first motor driving signal, in a high-speed mode when the speed change mode operator 102 outputs a high-speed mode signal.

Thereafter, the method to drive the electric bicycle (10, see FIG. 1) using the electric bicycle driving apparatus 500 according to the second embodiment of the present invention includes receiving power from the battery 103 under control of the controller 104 and boosting load of the second motor driving signal output from the second motor driver 108 to thereby output the resulting signal when the speed change mode operator 102 outputs the high-speed mode signal.

Finally, the method to drive the electric bicycle (10, see FIG. 1) using the electric bicycle driving apparatus 500 according to the second embodiment of the present invention includes turning on the motor speed change switching unit 512 upon selectively receiving a switching enable signal from the controller 104 to provide the second motor driving signal having the boosted load to the motor 101.

As described above, the electric bicycle driving apparatus 500 according to the second embodiment of the present invention includes the speed change mode operator 102, controller 104, first motor driver 106, second motor driver 108, motor drive load booster 110, and a motor speed change switching unit 512.

Accordingly, the electric bicycle driving apparatus 500 according to the second embodiment of the present invention may provide the second motor driving signal having the boosted load from the motor drive load booster 110 to the motor 101 as the motor speed change switching unit 512 is turned on when the first motor driving signal or second motor driving signal output from the first motor driver 106 or second motor driver 108 is applied to the motor 101 for a speed change mode.

In this way, the electric bicycle driving apparatus 500 according to the second embodiment of the present invention may achieve rapid switching response of the load boosted via the motor drive load booster 110 and turning-on of the motor speed change switching unit 512 when the motor 101 is driven in a speed change mode, which may reduce a speed change mode time in consideration of battery power consumption.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An electric bicycle driving apparatus, comprising:
   a speed change mode operator configured to output a low-speed mode signal or a high-speed mode signal;
   a controller configured to receive the low-speed mode signal or high-speed mode signal outputted from the speed change mode operator and output a first control signal corresponding to the low-speed mode signal or a second control signal corresponding to the high-speed mode signal;
   a first motor driver configured to receive the first control signal and output a first motor driving signal to drive a motor in a low-speed mode when the speed change mode operator outputs the low-speed mode signal;
   a second motor driver configured to receive the second control signal and output a second motor driving signal to drive the motor, which has been rotated by driving power of the first motor driving signal, in a high-speed mode when the speed change mode operator outputs the high-speed mode signal;
   a motor drive load booster configured to receive battery power from a battery under control of the controller and boost a load of the second motor driving signal outputted from the second motor driver to output the signal having the boosted load when the speed change mode operator outputs the high-speed mode signal; and
   a motor speed change switching unit configured to selectively receive a switching enable signal from the controller so as to be turned on to provide the second motor driving signal having the boosted load to the motor,
   wherein the motor drive load booster includes a capacitor and a zener diode, each of the capacitor and the zenor diode being electrically connected in parallel to the battery.

2. The apparatus according to claim 1, wherein the motor drive load booster includes:
   more than one first capacitor electrically connected to the battery;
   more than one first resistor electrically connected to the more than one first capacitor; and
   more than one second resistor electrically connected to the more than one first resistor and second motor driver.

3. The apparatus according to claim 2, wherein the motor drive load booster further includes more than one zener diode electrically connected to the battery and more than one first capacitor.

4. The apparatus according to claim 1, wherein the motor drive load booster includes:
   more than one third resistor electrically connected to the second motor driver;
   more than one fourth resistor electrically connected to the more than one third resistor and motor speed change switching unit; and
   more than one fourth rectifying diode electrically connected to the second motor driver and more than one third resistor.

5. The apparatus according to claim 4, wherein the motor drive load booster further includes more than one zener diode electrically connected to the more than one fourth rectifying diode, more than one third resistor and more than one fourth resistor.

6. The apparatus according to claim 1, wherein the motor speed change switching unit includes:
   more than one first rectifying diode electrically connected to one side of the speed change mode operator;
   a first switching device electrically connected to the more than one first rectifying diode and motor drive load booster;
   more than one fifth resistor electrically connected to the more than one first rectifying diode, first switching device, and motor drive load booster;
   more than one second rectifying diode electrically connected to the other side of the speed change mode operator;
   a second switching device electrically connected to the more than one second rectifying diode and first switching device; and
   more than one sixth resistor electrically connected to the more than one second rectifying diode, second switching device and motor.

7. The apparatus according to claim 6, wherein each of the first switching device and second switching device includes at least one of a Metal-Oxide Semiconductor Field Effect Transistor (MOSFET) and a Bipolar Junction Transistor (BJT).

8. The apparatus according to claim 6, wherein the first switching device further includes more than one zener diode electrically connected to the more than one fifth resistor and second switching device.

9. The apparatus according to claim 6, wherein the second switching device further includes more than one zener diode electrically connected to the first switching device and more than one sixth resistor.

10. The apparatus according to claim 6, wherein the motor speed change switching unit further includes more than one zener diode electrically connected to the motor drive load booster and more than one fifth resistor.

11. The apparatus according to claim 6, wherein the motor speed change switching unit further includes more than one zener diode electrically connected to the more than one sixth resistor and motor.

12. The apparatus according to claim 1, wherein the motor speed change switching unit includes:
more than one third rectifying diode electrically connected to one side of the speed change mode operator;
a third switching device electrically connected to the more than one third rectifying diode and motor drive load booster;
more than one seventh resistor electrically connected to the more than one third rectifying diode and third switching device; and
a fourth switching device electrically connected to the more than one third rectifying diode, more than one seventh resistor and motor.

13. The apparatus according to claim 12, wherein each of the third switching device and fourth switching device includes at least one of an MOSFET and a BJT.

14. The apparatus according to claim 12, wherein the third switching device further includes more than one zener diode electrically connected to the motor drive load booster and more than one seventh resistor.

15. The apparatus according to claim 12, wherein the fourth switching device further includes more than one zener diode electrically connected to the more than one seventh resistor and motor.

16. The apparatus according to claim 12, wherein the motor speed change switching unit further includes more than one zener diode electrically connected to the more than one seventh resistor, more than one third rectifying diode, and fourth switching device.

* * * * *